United States Patent
Balsfulland et al.

(10) Patent No.: US 7,370,603 B2
(45) Date of Patent: May 13, 2008

(54) POINTER INSTRUMENT

(75) Inventors: Wolfgang Balsfulland, Darmstadt (DE); Gerhard Friepes, Bad Nauheim (DE); Axel Förster, Offenbach (DE); Patrik Hurth, Dieburg (DE)

(73) Assignee: Siemens Aktiengesellschaft, München (DE)

( * ) Notice: Subject to any disclaimer, the term of this patent is extended or adjusted under 35 U.S.C. 154(b) by 93 days.

(21) Appl. No.: 11/300,906

(22) Filed: Dec. 15, 2005

(65) Prior Publication Data

US 2006/0144318 A1    Jul. 6, 2006

Related U.S. Application Data

(60) Provisional application No. 60/696,705, filed on Jul. 5, 2005.

(30) Foreign Application Priority Data

Dec. 16, 2004    (DE)    ...................... 10 2004 060 693

(51) Int. Cl.
*G01D 11/28*    (2006.01)
*G12B 11/04*    (2006.01)

(52) U.S. Cl. ................. 116/288; 116/48; 116/DIG. 36; 362/26

(58) Field of Classification Search ................. 116/46, 116/47, 48, 49, 288, 284, 286, 287, DIG. 6, 116/DIG. 36; 362/23, 26, 27
See application file for complete search history.

(56) References Cited

U.S. PATENT DOCUMENTS

| | | | | |
|---|---|---|---|---|
| 2,248,325 | A * | 7/1941 | Bacon ........................ | 116/62.1 |
| 3,131,670 | A * | 5/1964 | Hardesty .................... | 116/288 |
| 4,258,643 | A * | 3/1981 | Ishikawa et al. ............ | 116/286 |
| 5,084,698 | A * | 1/1992 | Sell ............................. | 345/83 |
| 5,414,595 | A * | 5/1995 | Oike et al. .................. | 362/489 |
| 5,582,129 | A * | 12/1996 | Furuya ........................ | 116/284 |
| 5,949,346 | A | 9/1999 | Suzuki et al. | |
| 6,152,066 | A | 11/2000 | Knoll et al. | |
| 6,408,783 | B1 | 6/2002 | Ludewig | |
| 6,450,656 | B1 * | 9/2002 | Noll ............................ | 362/23 |
| 6,484,663 | B2 | 11/2002 | Zech et al. | |
| 6,682,201 | B2 * | 1/2004 | Kneer et al. ................. | 362/26 |
| 7,159,534 | B2 * | 1/2007 | Tanaka et al. .............. | 116/300 |
| 2002/0108554 | A1 | 8/2002 | Zech et al. | |
| 2002/0174733 | A1 | 11/2002 | Rothermel | |

(Continued)

FOREIGN PATENT DOCUMENTS

DE    44 44 471    2/1996

(Continued)

*Primary Examiner*—Richard Smith
*Assistant Examiner*—Amy Cohen Johnson
(74) *Attorney, Agent, or Firm*—Cohen Pontani Lieberman & Pavane LLP

(57) ABSTRACT

A pointer instrument for a motor vehicle includes a pointer drive for deflecting a carrier body. A pointer which is visible in an indication is provided on the carrier body. An optical waveguide element is arranged on that side of the carrier body which is remote from an observer. Light from at least one light source is introduced into the optical waveguide element which extends along the movement path of the pointer. Light emerging from the optical waveguide element enters into the pointer and/or the carrier body, and the pointer is formed such that it is illuminated by light emerging from the optical waveguide element.

18 Claims, 2 Drawing Sheets

U.S. PATENT DOCUMENTS

| | | | |
|---|---|---|---|
| 2006/0144318 A1* | 7/2006 | Balsfulland et al. | 116/288 |
| 2006/0209525 A1* | 9/2006 | Birman et al. | 362/23 |
| 2006/0219155 A1* | 10/2006 | Honma et al. | 116/288 |
| 2006/0285308 A1* | 12/2006 | Birman et al. | 362/26 |
| 2007/0040697 A1* | 2/2007 | Suess et al. | 340/688 |

FOREIGN PATENT DOCUMENTS

| | | |
|---|---|---|
| DE | 196 22 900 | 2/1996 |
| DE | 198 49 161 | 5/2000 |
| DE | 199 16 221 | 7/2000 |
| EP | 0 990 873 | 9/1999 |
| EP | 0 997 338 | 5/2000 |
| FR | 2871229 A1 * | 12/2005 |
| JP | 2004170087 A * | 6/2004 |
| JP | 2005189168 A * | 7/2005 |

* cited by examiner

POINTER INSTRUMENT

CROSS-REFERENCE TO RELATED APPLICATIONS

The present application claims priority to U.S. Provisional Patent Application No. 60/696,705, filed Jul. 5, 2005, the entire contents of which are incorporated herein by reference. The present application also claims priority to DE 10 2004 060 693, filed Dec. 16, 2004.

BACKGROUND OF THE INVENTION

The invention relates to a pointer instrument, in particular for a motor vehicle, having a pointer drive for the deflection of a carrier body which can be rotated about an axis of rotation and on which is provided a pointer which is visible in an indication and is mounted outside the axis of rotation.

In pointer instruments of this type, the pointer is typically illuminated to ensure a problem-free reading even with diminishing light at twilight or at night. The arrangement of the pointer at a carrier body furthermore affords the advantage of being able to configure the carrier body in the form of a ring, for example, and in this way, given corresponding mounting, to keep the central region of the ring free from components of the pointer device. For illuminating the pointer, a luminous means that is carried along with the pointer is usually provided in this case, the luminous means regularly being supplied with the required voltage via a flexible line. Particularly in the case of the design as a ring pointer, use is made here at least in part of the particular advantage of the free central region of the pointer instrument. Since a large region is swept over by the flexible line at least on a side of an indication area—embodied as a dial for example—which is remote from the observer, and the region thus has to be kept free of other components, the advantage of the smaller structural space is partly used up. Furthermore, the structural depth of the carrier body is increased at least in sections on account of the required precautions for the active illumination, so that structural space restrictions in the region of the movement path of the pointer are added as a further disadvantage.

An example of an arrangement as described in the above background is disclosed in U.S. Pat. No. 6,484,663.

SUMMARY OF THE INVENTION

An object of the present invention is to configure the illumination of a pointer arranged on a carrier body such that, in the region alongside the movement path of the pointer, undesirable structural space restrictions are eliminated and an excellent illumination for readability is nevertheless effected.

The object of the present invention is met by a pointer instrument including an optical waveguide element arranged on that side of a carrier body which is remote from an observer, into which optical waveguide element light from at least one light source can be introduced and which optical waveguide element extends along at least one part of the movement path of the pointer. The pointer and/or the carrier body is formed in light-guiding fashion, so that the pointer can be illuminated by means of light emerging from the optical waveguide element. The arrangement of a light-distributing optical waveguide element between the light source and the pointer or carrier body to be illuminated has the major advantage that the structural outlay for the power supply of a light source and the light source itself can be shifted into a region of the pointer instrument which offers more constructional free space than that near the indication or indication area. Furthermore, the optical waveguide element can be configured in terms of its form and its emission characteristic, with little complexity, such that stray light in the viewing region of the indication is avoided.

The advantages according to the invention, in particular the free structural space in the regions that are at least partly enclosed by the carrier body or are adjacent to the carrier body, are fully effective if the carrier body is driven by a drive outside the axis of rotation of the pointer drive or is mechanically connected to such a drive.

The particular advantage of the invention resides in the elimination of the need for a power supply for a light source arranged on the pointer. The invention's guiding of light from a stationary light source to the moving pointer with the interposition of an interface of the optical waveguide element and an interface of the carrier body or pointer allows the use of existing light sources for illuminating a moving pointer. In this way, it is possible to omit the flexible conductor that entails structural restrictions and to omit a light source arranged on the pointer. The resulting free space can be used for further indication modules. A particularly advantageous application of the invention is in the case of a design of the pointer or carrier body as a ring pointer or ring which is mounted and driven at locations on its circumference and in this way leaves the central region free. The carrier body which carries the pointer may expediently be covered toward the observer, so that only the pointer is visible.

An optical waveguide element may advantageously be arranged on that side of the carrier body which is remote from an observer, which optical waveguide element has a first coupling-in area, into which light from at least one light source can be introduced, and which optical waveguide element has a first coupling-out area extending along the movement path of the pointer. The pointer and/or the carrier body has a second coupling-in area, which is arranged opposite the first coupling-out area of the optical waveguide element, so that light emerging from the first coupling-out area can enter into the second coupling-in area of the pointer and/or of the carrier body. The pointer is formed such that it can be illuminated in this way. This configuration solves the problem of guiding light to the moving pointer particularly expediently by virtue of pairs of coupling-in areas—coupling-out areas of the pointer and the optical waveguide being configured such that they are relatively movable with respect to one another.

The pointer instrument may have a scale extending along the movement path of the pointer, so that the pointer is formed such that it can be moved along the scale in order to indicate measured values. Particularly in the case of a curved or even circle-segment-shaped movement path of the pointer, it is expedient for a traditionally appealing appearance if the pointer on the radially inner side of the scale indicates the measured values in an outwardly directed manner. In order to attain a larger free region radially on the inside of the movement path, the pointer may also expediently indicate the measured values radially from the outside.

Particular flexibility is attained by representing the scale on a display. In this way, e.g. a changeover of the physical unit of the scaling can be effected without any problems.

In accordance with the arrangement and the pointing direction of the pointer—that is to say radially outwardly or radially inwardly—it is expedient to arrange the scale radially outside the circle or radially inside.

The present invention is particularly suitable in conjunction with light sources formed as light emitting diodes, since, on account of their low evolution of heat, these can also be arranged close to the first coupling-in area in an unproblematic manner. In this case, it is expedient, particularly when using surface mounted (SMD) light emitting diodes, for the optical waveguide element to be arranged directly on a printed circuit board and to be fixed there. A design of the optical waveguide element which has a plurality of coupling-in areas, at each of which at least one light source or light emitting diode is provided, is particularly advantageous in this case. The coupling-in areas may in this case be provided as end cutouts in the optical waveguide element. The light sources or light emitting diodes may also be formed such that they emit light of different colors along the movement path of the pointer or can even be changed over with regard to the light emission color. A particularly expedient configuration of the optical waveguide element is one which provides at least in part an embodiment of the direction of extent parallel to the indication at least in sections as a preferably circle-segment-shaped ring whose first end side is provided with at least one first coupling-in area and whose second end side is provided with at least one first coupling-out area.

An embodiment of the scale as a dial whose digits are formed at least partly in transmissive fashion has the advantage of a particularly high-contrast representation of the digits in the event of backlighting.

A drive unit of the pointer instrument may provide for the fact that light sources arranged along the movement path of the pointer are driven or are driven separately only when the pointer is in a specific proximity to the light source on the movement path. This avoids the situation in which light sources which, in terms of their arrangement, exceed a specific distance from the pointer and therefore make a low contribution to the illumination of the pointer consume an unnecessarily large amount of energy and contribute to the heating of the pointer instrument. The relevant region can thus additionally be emphasized. In order that the light which is emitted by the light sources and is forwarded to the carrier body by the optical waveguide element contributes to the greatest possible extent to the illumination of the pointer, it is expedient if the carrier body is formed at least in part as an optical waveguide and configured in such a way that light incident into the second coupling-in area is at least partly deflected to the pointer.

Further benefit can be obtained from the use of the optical waveguide element according to the invention if the optical waveguide element also has a second coupling-out area besides the first coupling-out area, which second coupling-out area points in the direction of an observer and is arranged on that side of the scale which is remote from the observer, and the optical waveguide element is formed in such a way that a first part of the coupled-in light emerges from the second coupling-out area and a second part of the coupled-in light emerges from the second coupling-out area, so that the pointer is illuminated and the scale is backlit in this way. For this purpose, a particularly expedient configuration of the optical waveguide element is one which has, at least in sections in a plane perpendicular to the indication, a cross section which has a first section extending from the coupling-in area situated in the region of the light source to the first coupling-out area situated in the region of the carrier body or pointer, and which cross section has a second section, which has a second coupling-out area and which branches off from the first section, the second coupling-out area being arranged for backlighting a scale on the rear side of a dial section or of a display. In the same way as the scale, it is expedient if the optical waveguide element has in a direction of extent a curvature running parallel to the indication and the second section is arranged radially on the inside. Particularly in the case of a design of the second section tapering in the direction of increasing radial distance from the first section, the structural space advantage attained in the central region of the pointer instrument is manifested to its full degree since no further light sources are required for the backlighting of the scale.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
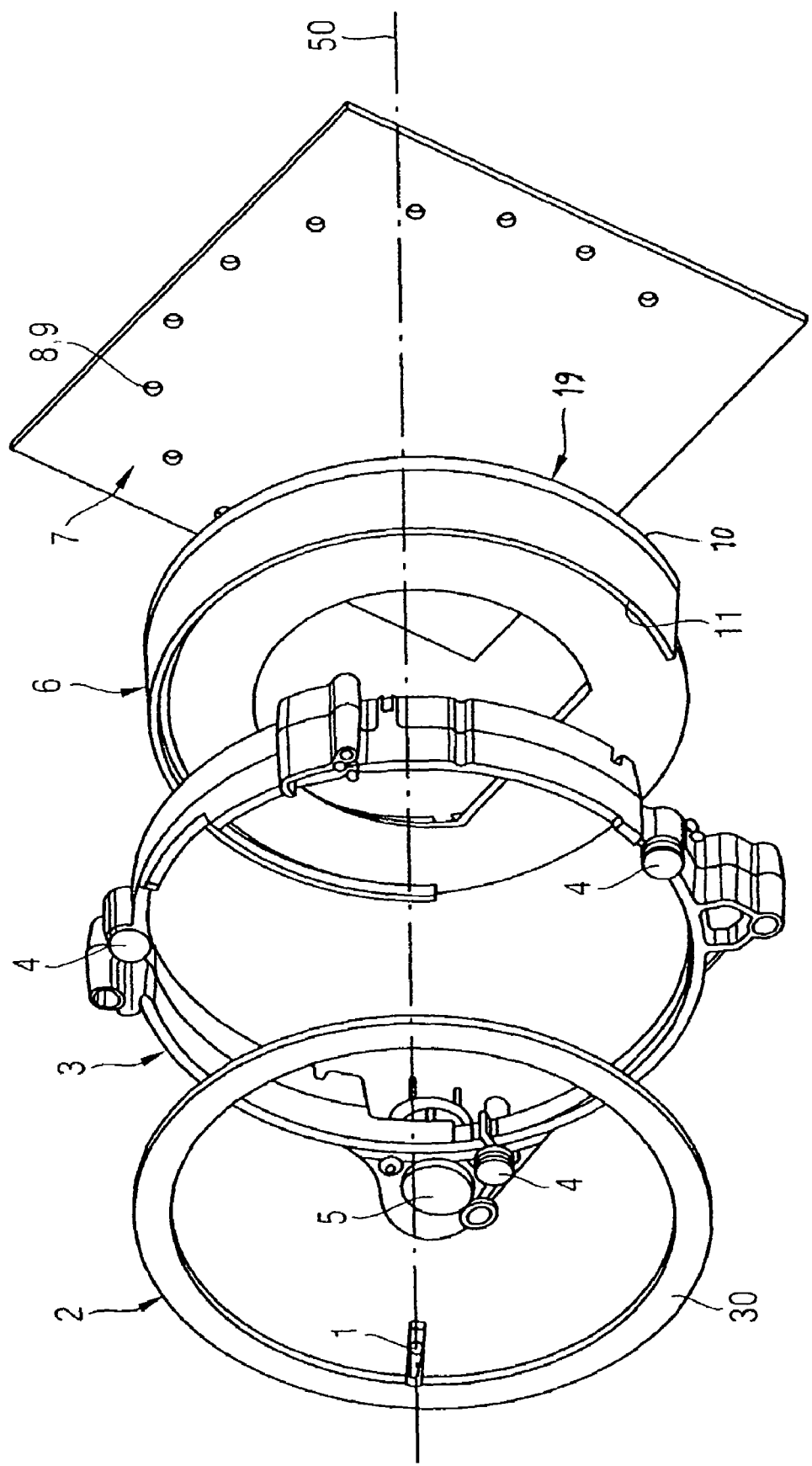
FIG. 1 is a three-dimensional exploded view of components of a pointer instrument according to the present invention.

FIG. 1 shows essential components of a pointer instrument according to the present invention which are arranged along an axis 50 of rotation. The pointer instrument includes a pointer 1 with a carrier body 2, a holder 3 with three bearings 4 and a pointer drive 5, an optical waveguide element 6, a printed circuit board 7 and light sources 9 formed as light emitting diodes 8, which are fixed and electrically contact-connected as SMD on the printed circuit board 7.

Figure 2:
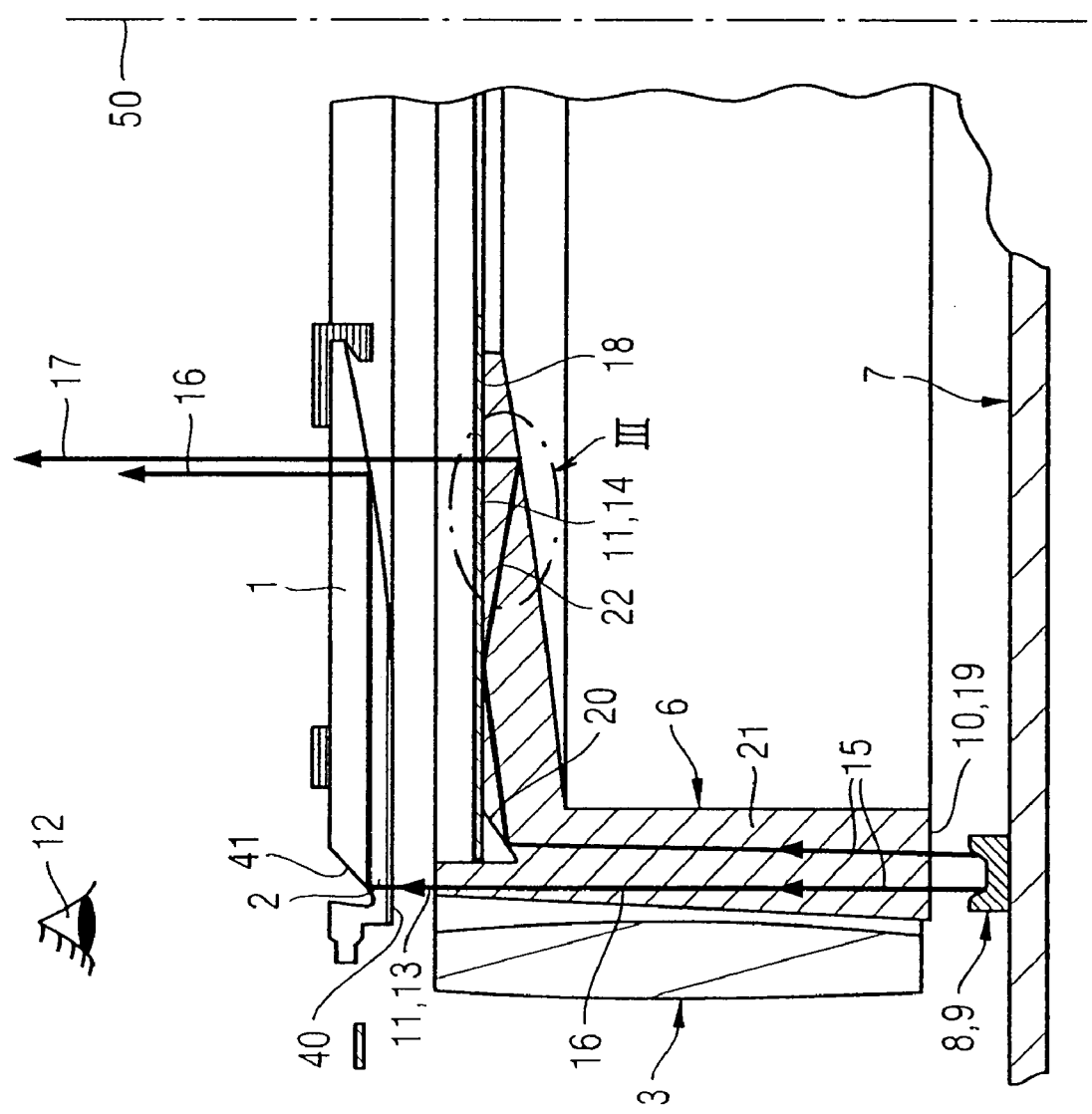
FIG. 2 is a partial cross section through one side of the components of a pointer instrument according to FIG. 1.

The optical waveguide element 6 is essentially formed as a cylindrical ring, a first end side 10 being provided with first coupling-in areas 19 illustrated in FIG. 1 and being arranged on the printed circuit board 7. The light emitting diodes 8 are arranged on the printed circuit board 7 at essentially equidistant distances from one another in a manner following the ring form, and radiating into the first coupling-in areas 19. FIG. 2 shows light from one of the light emitting diodes 8 entering one of the first coupling areas 19.

Figure 4:
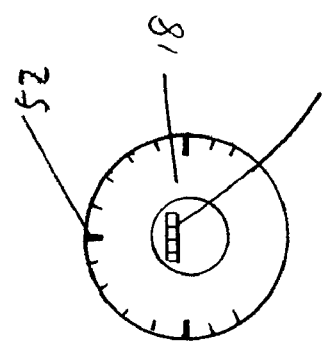
FIG. 4 shows a dial including a scale.

FIG. 2 is a sectional view of the assembled pointer instrument. The holder 3 surrounds the optical waveguide element 6, which has, on a second end side 11 opposite to the first end side 10, two coupling-out areas facing an observer 12, a first coupling-out area 13 and a second coupling-out area 14. The light 15 from the light source 9 is split into two parts 16, 17 in the optical waveguide element 6, a first part 16 of the light 15 serving for illuminating the pointer 1 and a second part 17 of the light 15 being used for the backlighting of a dial 18 facing the observer 12. The dial 18 is provided with a scale 52 (see FIG. 4) on which the pointer 1 indicates measured values (not illustrated in detail) during operation. In order to divide the light 15 into the two parts 16, 17, the optical waveguide element 6 has a reflection area 20, at which the second part 17 of the light 15 is reflected in a manner separating it from the first part 16.

The optical waveguide element 6 essentially comprises a first section 21 and a second section 22. The first section 21 guides the light 15 from the first coupling-in area 19 essentially in straight extension to the observer, and the second section 22 diverts the second part 17 of the light 15 to radially inside the ring form for illuminating the dial 18. The radially inwardly extending second section 22 tapers with increasing distance from the first section 21 with regard to its material thickness in a rotationally axial direction, so that the dial 18 is illuminated as homogenously as possible in a radial direction.

For a homogeneous illumination in the circumferential direction of the ring form over an angular range of approximately 270°, a total of twelve light emitting diodes 8 are arranged in the circumferential direction in the printed circuit board 7, the material of the optical waveguide element 6 eliminating the brightness differences—arising on account of the local coupling-in of light—to the pointer 1 or the dial 18 by means of diffusion.

Figure 3:
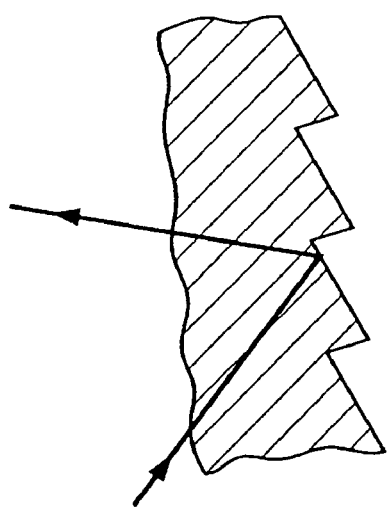
FIG. 3 is an enlarge view of a circled portion III of FIG. 2.

In the central region of the ring form of the pointer instrument, the design according to the invention enables the arrangement of a display 51 (see FIG. 4) by means of which further information can be indicated to the observer 12. On account of the ring form of the carrier body 2, the pointer 1 has a circular movement path 30 which defines a plane of the indication. The pointer 1 or the carrier body 2 is provided with a second coupling-in area 40 opposite the first coupling-out area 13. At an interface 41, the entering part 17 of the light 15 is reflected in the direction of extent of the pointer 1 until the tapering pointer form, likewise by means of an interface, reflects the light 15 in accordance with the beam course illustrated in FIG. 3 in the direction of the observer 12. The surface structure illustrated in FIG. 3 is configured in such a way, and the form of the pointer 1 is in this case chosen in tapering fashion in such a way, that homogeneous illumination over the length of the pointer 1 is effected.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pointer instrument for a motor vehicle, comprising:
   a carrier body having a pointer rotatable about an axis of rotation such that the pointer is located outside of the axis of rotation;
   a pointer drive connected to said carrier body for deflecting said carrier body about the axis of rotation along a movement path;
   an optical wave guide element arranged on a side of said carrier body which is remote from an observer and extends along at least a portion of the movement path about the axis of rotation, the optical wave guide element comprising a reflection area, a first coupling-out area, and a second coupling-out area; and
   a light source emitting light and arranged so that the light from said light source is introduced into said optical waveguide element,
   wherein at least one of said pointer and said carrier body comprises a light-guiding element, and
   wherein the reflection area is configured to separate the light from the light source into a first part directed to the first coupling-out area, and a second part directed to the second coupling-out area, said pointer being illuminated by light emerging from the first coupling-out area.

2. The pointer instrument of claim 1, wherein said carrier body is arranged outside the axis of rotation of said pointer drive.

3. The pointer instrument of claim 1, wherein said optical waveguide element comprises a first coupling-in area through which the light from said light source is introduced into said optical waveguide elements, the first coupling-out area extending along the movement path of said pointer, and wherein said at least one of said pointer and said carrier body comprises a second coupling-in area confrontingly opposing said first coupling-out area so that light emerging from said first coupling-out area enters said second coupling-in area, said pointer being illuminated by the light entering said second coupling-in area.

4. The pointer instrument of claim 3, wherein said carrier body is formed at least in part as an optical waveguide and arranged so that light incident into said second coupling-in area is at least partly deflected to said pointer.

5. The pointer instrument of claim 3, further comprising a scale extending along the movement path of said pointer, said pointer being arranged so that said pointer is movable along the movement path to indicate measured values, wherein said second coupling-out area is arranged on a side of said scale which is remote from the observer, said optical waveguide element being further arranged so that light emerging from the second coupling-out area backlights said scale.

6. The pointer instrument of claim 5, wherein at least a portion of said optical waveguide element has a cross section area perpendicular to the movement path having a first section extending from said first coupling-in area to said first coupling-out area and a second section branching off from said first section and having said second coupling-out area arranged for backlighting said scale.

7. The pointer instrument of claim 6, wherein said optical waveguide element has a curvature in a direction of extent of an indication on said scale, said second section being arranged radially inside of said first section.

8. The pointer instrument of claim 6, wherein said second section has a cross section which tapers with radial distance from said first section.

9. The pointer instrument of claim 6, further comprising one of a display and a dial on which said scale is arranged, said one of a display and a dial being backlit by light emerging from said second coupling-out area.

10. The pointer instrument of claim 1, further comprising a scale extending along the movement path of said pointer, said carrier body and said pointer being arranged so that said pointer is movable along the movement path to indicate measured values along said scale.

11. The pointer instrument of claim 10, further comprising a display representing said scale.

12. The pointer instrument of claim 10, wherein said scale is arranged radially outside the movement path.

13. The pointer instrument of claim 10, further comprising a dial having said scale, said dial having light transmissive digits.

14. The pointer instrument of claim 1, wherein the movement path is a circle segment or a circle.

15. The pointer instrument of claim 1, wherein said at least one light source comprises a plurality of light emitting diodes.

16. The pointer instrument of claim 1, wherein said optical waveguide element comprises at least a portion of a cylindrical ring having a first side having a first coupling-in area for receiving the light from the light source, and a second side having the first coupling-out area for guiding the received light thereout.

17. The pointer instrument of claim 16, further comprising a printed circuit board, said first side of said optical wave guide element faces the printed circuit board so that said first coupling-in area faces an area of said printed circuit board populated with light emitting diodes.

18. The pointer instrument of claim 1, wherein said first coupling-out area of said optical waveguide element is ring-shaped and extends over at least a partial circle.

* * * * *